United States Patent [19]
Roberts

[11] Patent Number: 6,005,695
[45] Date of Patent: Dec. 21, 1999

[54] OPTICAL TRANSMISSION SYSTEM

[75] Inventor: Kim Byron Roberts, Welwyn Garden, United Kingdom

[73] Assignee: Nortel Networks Corporation, Montreal, Canada

[21] Appl. No.: 08/662,571

[22] Filed: Jun. 13, 1996

[51] Int. Cl.⁶ .................................................. H04B 10/00
[52] U.S. Cl. ............................................ 359/110; 359/177
[58] Field of Search .................................. 359/110, 177, 359/187, 161, 117, 118, 120, 121, 176, 178, 179

[56] References Cited

U.S. PATENT DOCUMENTS

| | | | |
|---|---|---|---|
| 5,440,418 | 8/1995 | Ishimura et al. . | |
| 5,453,990 | 9/1995 | Aoki et al. | 371/20.1 |
| 5,513,029 | 4/1996 | Roberts et al. | 359/177 |
| 5,585,954 | 12/1996 | Taga et al. | 359/158 |
| 5,623,355 | 4/1997 | Olsen | 359/110 |
| 5,654,816 | 8/1997 | Fishman | 359/177 |

FOREIGN PATENT DOCUMENTS 0 554 126 A1  8/1993  European Pat. Off. .

*Primary Examiner*—Rafael Bacares
*Attorney, Agent, or Firm*—John D. Crane

[57] ABSTRACT

A verification system for a switch or other element in a digital transmission system includes a sample extraction means for tapping a input to the switch, and a similar means for tapping an output of the switch. Analogue features of the signal passing through the switch are tapped off and compared by pattern matching without demultiplexing digital data from the signal passing through the switch. The result of the match can be used to verify the switch has switched correctly, or to monitor other parameters such as cross-talk.

18 Claims, 8 Drawing Sheets

OPTICAL TRANSMISSION SYSTEM

FIELD OF INVENTION

The present invention relates to verification systems, signal analysis systems, elements of optical transmission systems, and corresponding methods.

BACKGROUND OF THE INVENTION

Digital transmission systems for communication usually include links in which many slower data streams are multiplexed together onto a single higher speed link. This higher speed link may be implemented by an optical transmission system. Such systems can be end to end links, or networks of optical links, with switching elements. Testing and verifying the elements of such an optical network can pose problems, particularly because the data rates are often very high.

It is known that connectivity through a network can be guaranteed by network layer protocols such as TCP/IP, which can request retransmission if some data does not arrive. At the physical data transfer level, path trace bytes can be inserted and checked to ensure a frame of data has been routed correctly. However, such methods involve demultiplexing the data stream, which only usually takes place at a terminal at the end of the path through the optical network.

Testing using analogue features is known, but only for limited purposes. It is known from U.S. Pat. No. 5,282,074 to obtain values of an optical signal before and after it passes through an optical amplifier. The values are subtracted to give a value for the noise introduced by the amplifier.

Other transmission systems in which analog signals are switched are known, such as old fashioned analogue telephone exchanges using relays. However, no attempt was made to verify connections, or compare input to output.

The present invention seeks to improve on such known arrangements.

According to one aspect of the invention, there is provided a verification system for switching element in an optical network comprising means for comparing an optical signal before it is input to the switching element, with an optical signal after being output from the switching element, and means for verifying from the comparison whether the switching element has switched the input signal correctly.

Such a system enables verification of each element individually, to aid fault isolation, without requiring expensive data demultiplexing hardware for each element.

A preferred feature involves using a portion of the frequency spectrum of the signal, for the comparison. This facilitates rapid comparison, and may reduce the expense or the quantity of the hardware required.

The feature of the input signal which is chosen for comparison may be unique, or if not unique, then at least partially independent from other input signals.

This independence enables verification of connectivity, and enables a degree of confidence in the verification to be established.

If the comparison means compares the input and output signals by pattern matching, the degree of confidence in the correctness of the verification can be improved.

A further advantageous feature involves verifying a correct connection on the basis of a threshold determined on the basis of a predetermined cost of false verification, and a predetermined cost of false non verification. This enables the threshold to be determined so as to optimize the verification for circumstances in which the cost or effect of a false verification is different from that of a false non-verification.

If the switching element comprises a plurality of input paths, the verification system may need to determine which input path is currently being switched to the output path, so that the corresponding signal is compared with the output signal by the comparison means. This enables a single comparison means to be used for multiple possible paths through the switching element, which enables a reduction in the amount and expense of the comparison circuitry.

Advantageously, the system comprises means for comparing input and output signals for a plurality of different inputs to the switching element, and determining a degree of cross-talk between said inputs.

This enables another parameter to be tested using essentially the same hardware as is used for the verification of connection.

Advantageously, where the switching element a plurality of input signals, there may be a means for comparing a pair of set plurality of input signals, and determining a degree of matching between patterns in them. This can assist in obtaining the value of cross-talk between inputs, and furthermore, it may assist in determining a degree of independence between input signals, which can be used to determine the confidence level in the correctness of the verification result. Advantageously, the threshold may be determined according to a desired confidence level.

According to another aspect of the invention, there is provided a signal analysis system for an element in a digital transmission system, comprising means for comparing an analogue feature of input signal of the element, with the same feature of a signal output from the element, wherein the comparing means is operable by pattern matching.

This enables a range of parameters of the element to be tested, or features of the element to be controlled, according to the result of the matching. By pattern matching features taken in analogue form from the signal passing through the element, rather than extracting digital features, the hardware can be simplified, and thus costs can be minimized. Advantageously, the element is a switching element, and the system comprises means for verifying from the matching result whether the switching element has switched the input signal correctly. This can be used either when setting up a new switching element, or for monitoring the performance of the element in service, to assist in detecting and isolating faults.

Advantageously, where the switching element has a plurality of input signals, the comparison means is arranged to compare the plurality of input signals with the output signal, and the system comprises means for determining the cross-talk between an input signal not switched to the output, and the output signal. This is one vital parameter of a switching element. Accordingly, fault isolation and determination of the cause of the fault can be facilitated if cross-talk can be determined.

Advantageously, the comparison means is arranged to compare the phase of a low frequency dither present of the input signal at a random phase, with a corresponding dither on the output signal. The use of a low frequency dither minimizes the disturbance to data traffic, while enabling detection with simpler hardware.

Another aspect of the invention provides a method of verifying the operation of a switching element in an optical transmission system, the method comprising the steps of: comparing an optical signal before it is input to the switching element, with an optical signal after being output from the switching element: and verifying from the comparison whether the switching element has switched the input signal correctly.

The invention will now be described by way of example, to show how it may be carried into effect, with reference to the drawings, in which;

DETAILED DESCRIPTION

Figure 1:
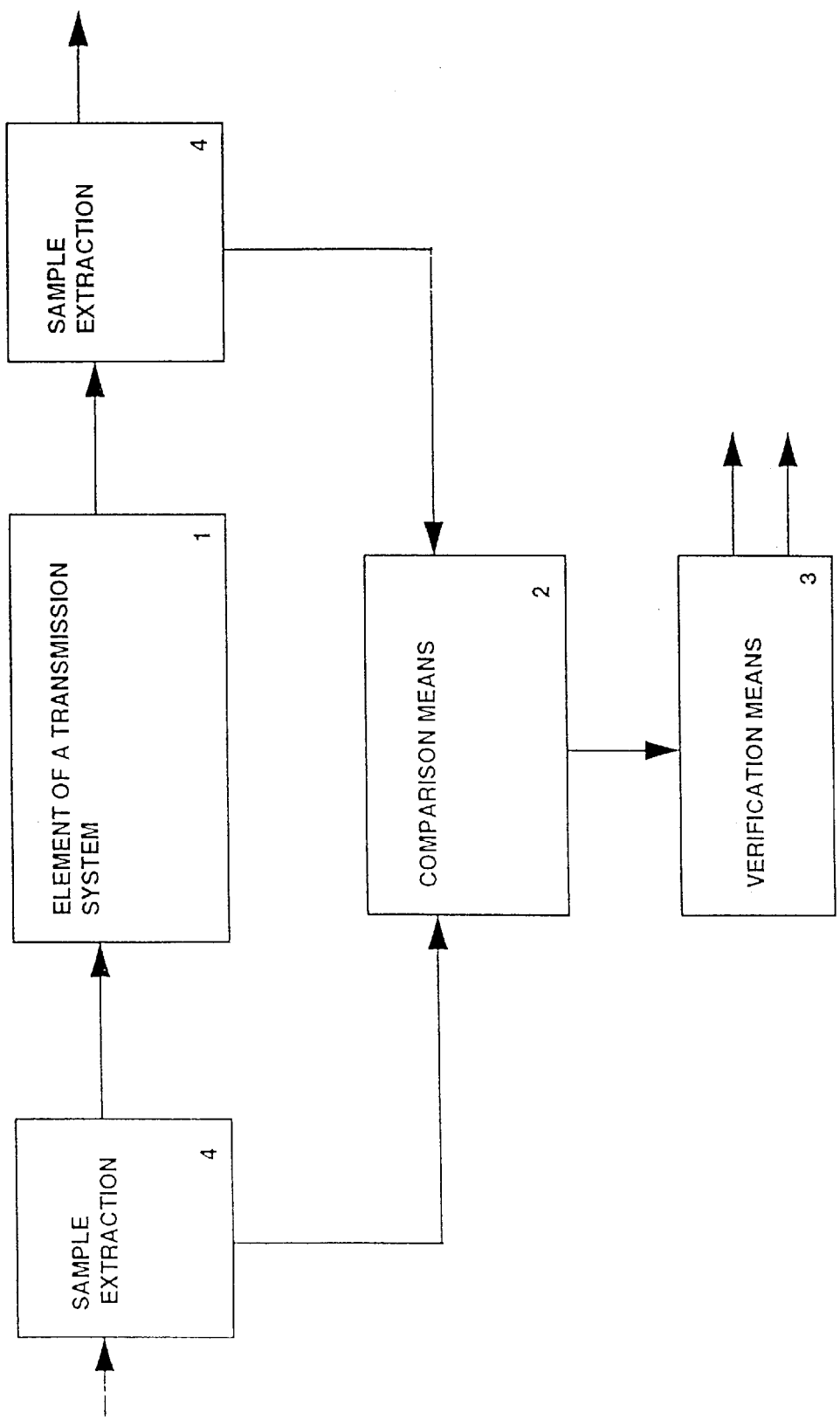
FIG. 1 shows in schematic form a transmission system including an embodiment of the invention.

FIG. 1 shows part of a transmission system including an element of the system such as a switching element 1, a comparison means 2, a verification means 3, and a sample extraction means 4. A sample extraction means is provided at the input to the switching element, and another sample extraction means is provided at the output of the switching element. Each sample extraction means provides an input to the comparison means. The comparison means provides an input to the verification means.

The verification means has two outputs, one for indicating whether the switching element has switched the input signal correctly, the other output indicating a degree of confidence in the correctness of the verification result.

Figure 2:
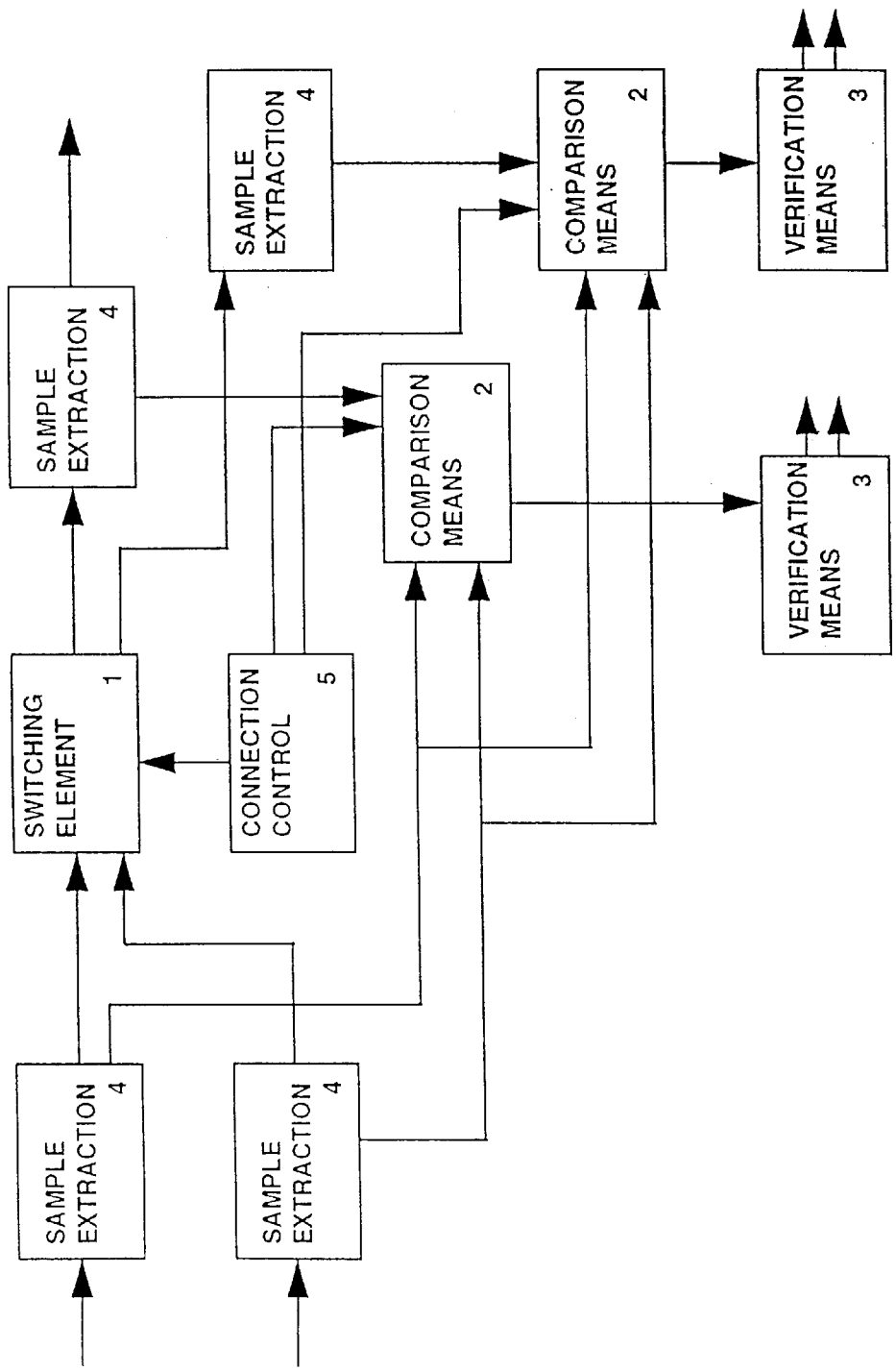
FIG. 2 shows a more detailed schematic diagram of an implementation of the system of FIG. 1.

FIG. 2 shows a more detailed schematic diagram for a switching element which has two inputs and two outputs. Typically switching elements may have many more inputs and outputs, and these have not been shown for the sake of clarity. In principle switching elements can have one input and one switched output, or multiple inputs to one output, multiple outputs for one input, or multiple inputs to multiple outputs. The invention is applicable to all such switching elements. The second aspect of the invention is more widely applicable to any element which has an input and an output and which may alter the output signal in some way while passing the analogue feature being compared.

For each output, a comparison means is provided, and each comparison means has a respective verification means. It is more convenient to provide the comparison means at the output side, and provide one comparison means for each output. In this case, two input signals are provided to each comparison means, either of which can be compared with the output signal by the comparison means. In principle, it would be possible to provide a separate comparison means for each possible path through the switching element, though obviously this would require more hardware.

FIG. 2 shows a connection controller 5 for controlling the path to be switched by the switching element. It is useful for the comparison means to know which input is being connected by the switching element to which output. Accordingly, the connection controller 5 is connected to each comparison means, to enable the comparison means to select an appropriate input signal from the two input signals shown.

Figure 3:
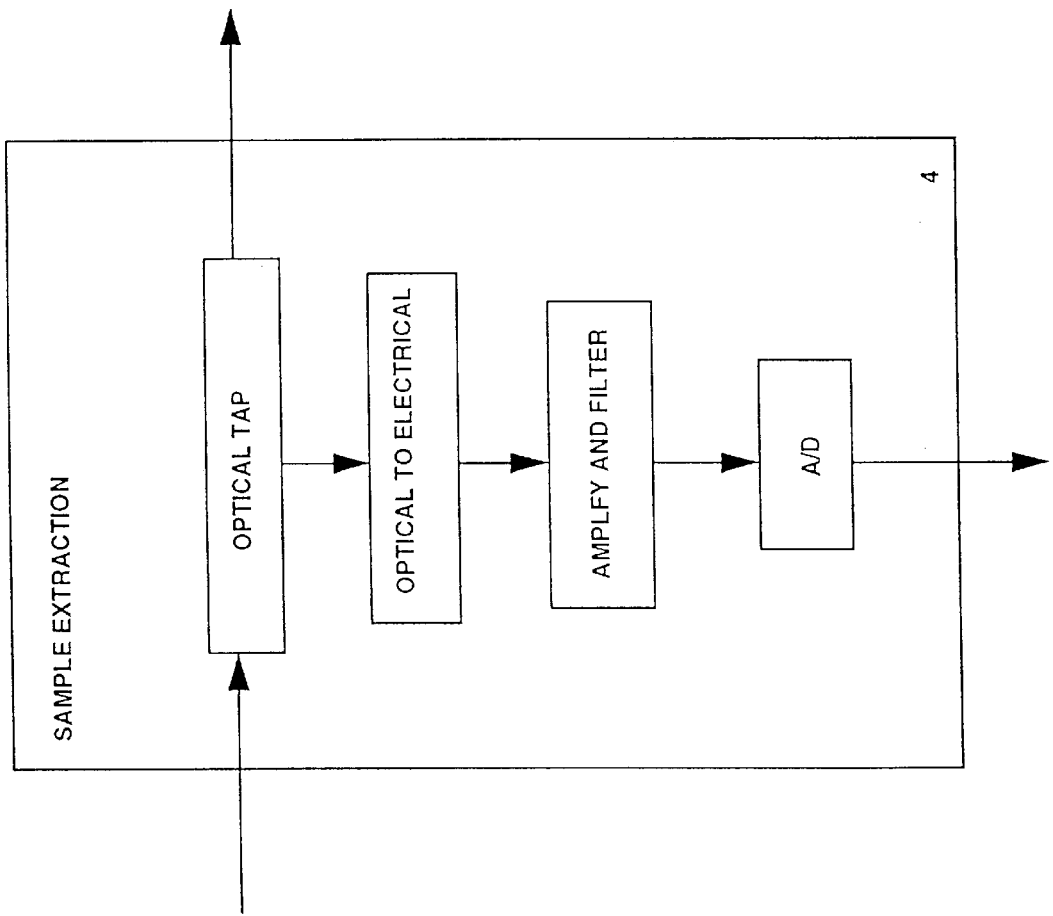
FIG. 3 shows a schematic diagram of a sample extraction element as shown in FIG. 2.

FIG. 3 shows the sample extraction means in more detail. It shows an optical tap in the main optical fibre route. If the main signal passing through the sample extraction element is in electrical form, then without demultiplexing the digital information in this signal, an electrical sample of the main signal can be extracted. In the embodiment illustrated, the extracted signal is amplified, filtered and converted into digital samples. However, the digital data in the signal is not demultiplexed, and therefore the digital samples still represent an analogue signal. The data could be scaled to an RMS value of 1.0 to enable the ultimate verification to be independent of signal power variations. It is preferable to scale inputs at this stage so as to avoid integer arithmetic overflow problems.

Figure 4:
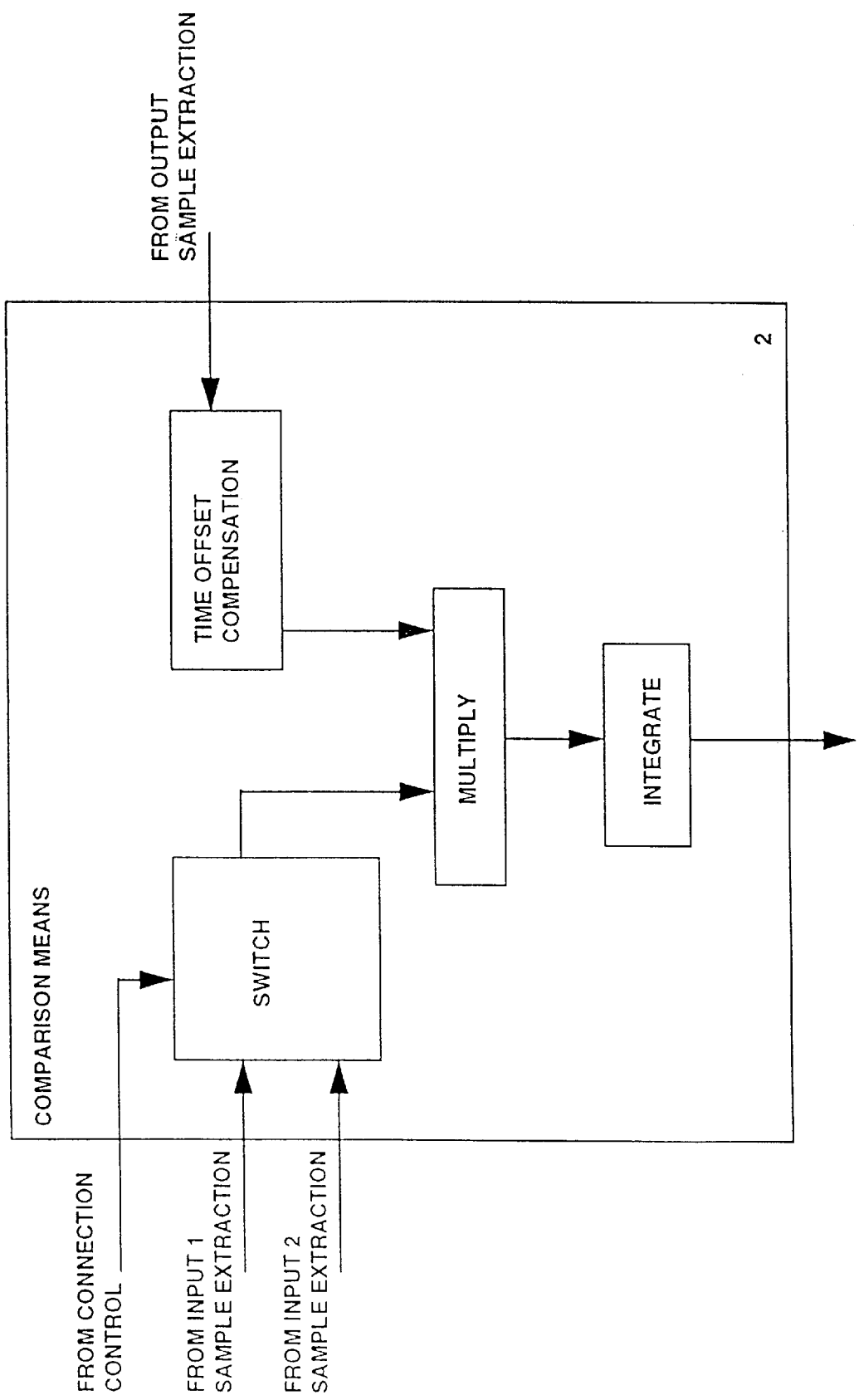
FIG. 4 shows a schematic diagram of an example of a comparison means as shown FIG. 1 or FIG. 2.

FIG. 4 shows in schematic form more detail of the comparison means 2. The comparison means preferably involves pattern matching to minimize the effects of noise and gain differences. In principle it could be carried out by analogue or digital methods. Pattern matching can be carried out in many ways. One advantageous way is by a correlation involving multiplying and integrating. The comparison means of FIG. 4 includes a switch for performing a selection function, selecting either input 1, or input 2 from different sample extraction elements. This selection is carried out according to the input from the connection control. The selected input is multiplied with the output of the switching element of the optical transmission system, obtained by an output sample extraction means. If necessary, the time delay caused by the switching element of the optical network is compensated before the multiplication takes place. An integration of the multiplication result is carried out. These steps give a correlation of the input and output signals over a period of time. Filtering of the input and output signals which are correlated takes place in the sample extraction means, and may additionally take place in the comparison means. Thus the signals being compared may be only the low frequency components of the total bandwidth of the optical signal passing through the switching element of the optical transmission system.

These low frequency components may be arranged to be unique for any particular input signal, or if not unique, may be arranged to be at least partially independent. In the former case, it is possible to determine whether the switching element has switched the input signal correctly without considering the degree of independence of the low frequency features of the input signals which are being compared with the respective output signal. In the latter case, it may be appropriate to consider the statistical degree of independence of the feature being compared, in determining the correctness of the verification, and in setting thresholds for determining whether the switching element has switched the input signal correctly.

Figure 5:
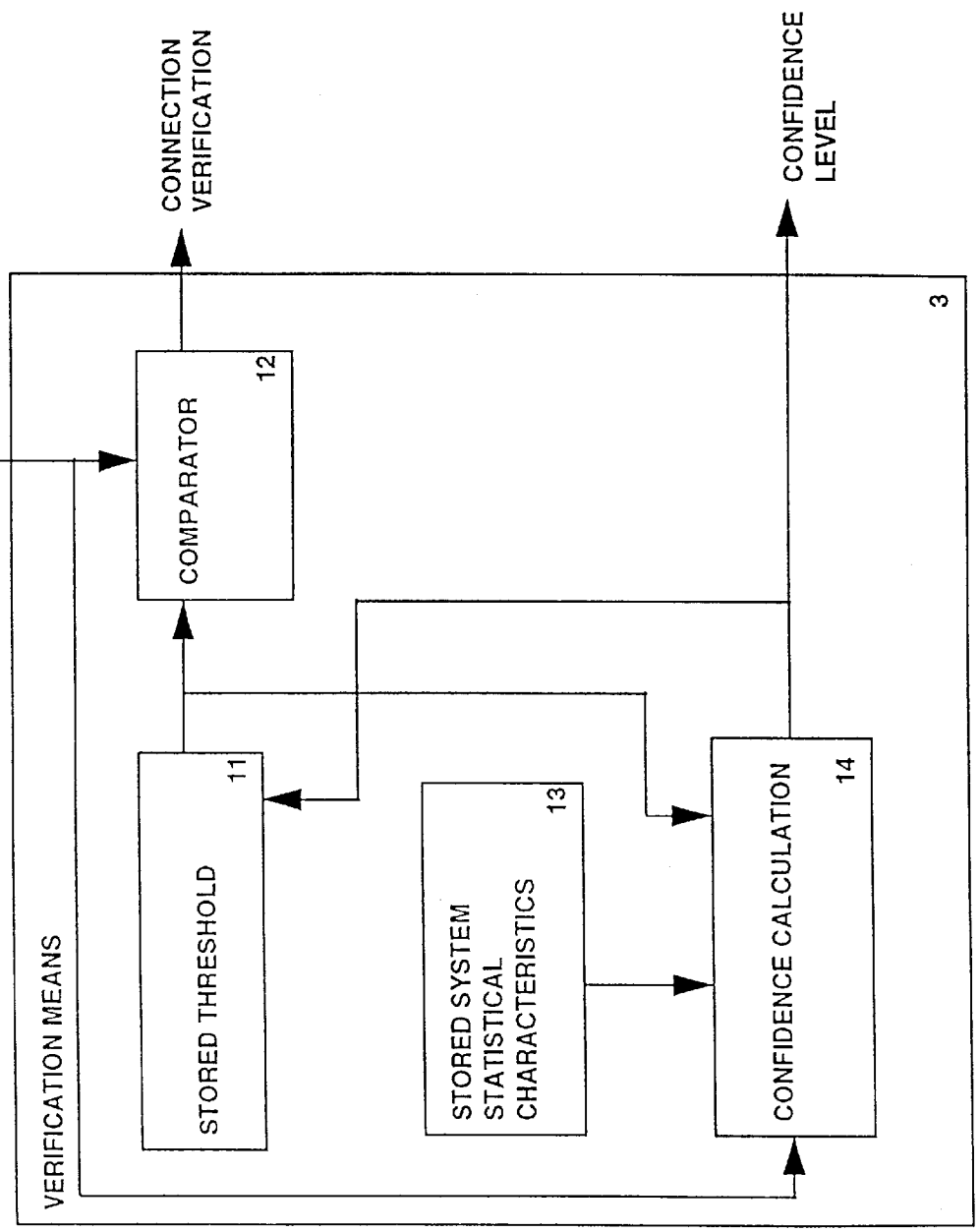
FIG. 5 shows a schematic diagram of an example of a verification means as shown in FIG. 2.

FIG. 5 shows the verification means 3 in more detail. The correlation result is fed to a comparator 12 from the comparison means. Here it is compared to a threshold and the output of the comparator is the connection verification result. A confidence level is output based on the stored threshold and stored system statistical characteristics. The threshold used may be adjusted according to the calculated confidence level. The stored system statistical characteristics may include the noise levels introduced at various parts in the system, details of the features being compared, details of the correlation method, as well as the statistical variation in the inputs being compared.

From a knowledge of the statistics of the inputs and noise present in the system, decision thresholds and confidences can be refined adaptively. This is advantageous where the statistics and noise change with time, or where different applications of a given design may experience significantly different input statistics.

This has standard methods of solution from the radar field. Reference is made to Weber, "Elements of Detection and Signal Design", McGraw-Hill, N.Y. 1968.

Figure 6:
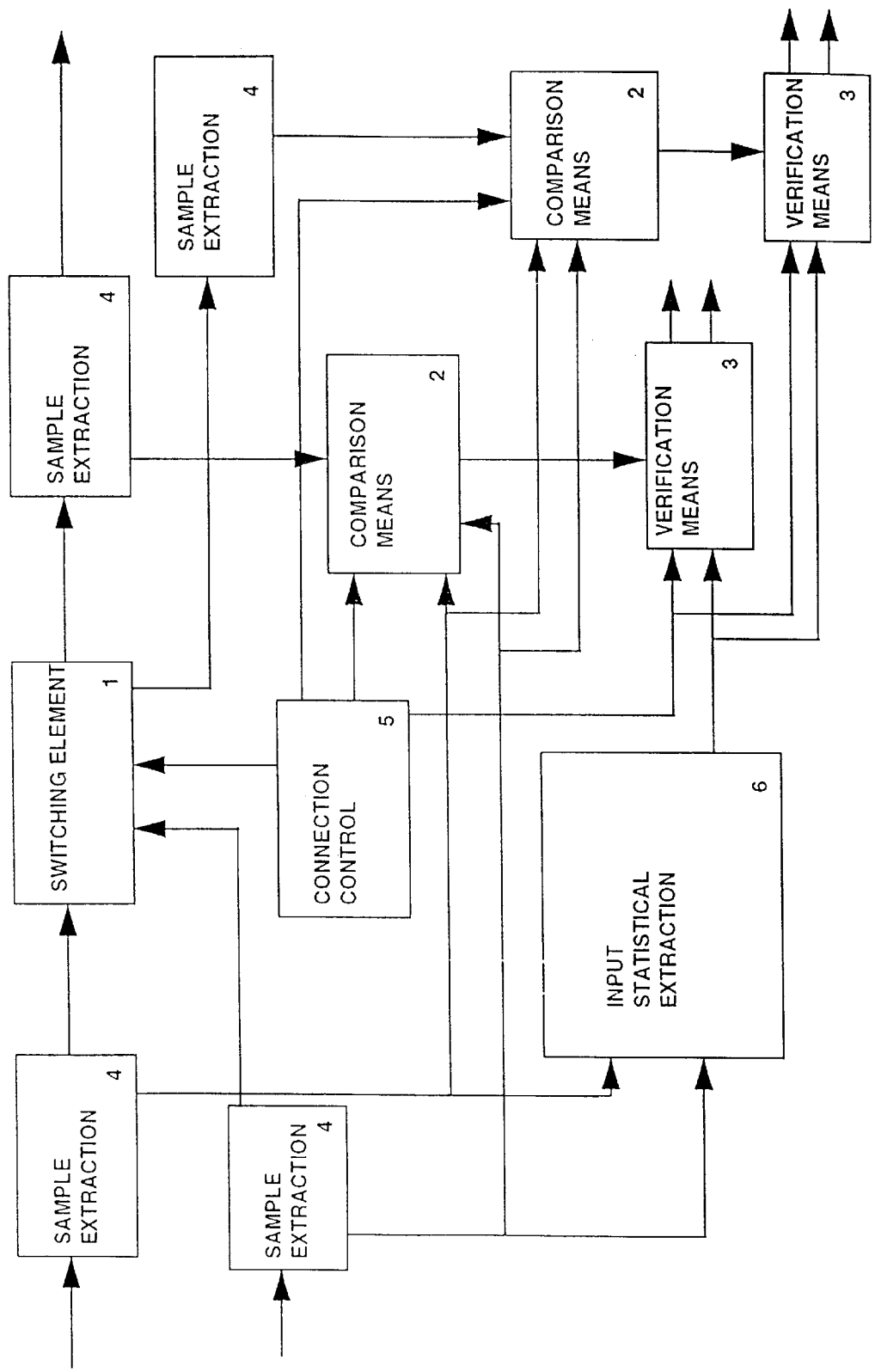
FIG. 6 shows another schematic diagram of the invention, including an input statistical extraction feature.

FIG. 6 shows an overall schematic diagram similar to that of FIG. 2 but additionally showing an input statistical extraction means 6, which is fed by the outputs of the sample extraction means for each of the inputs of the switching element 1 of the optical network. The result of the calculations made on the inputs by the statistical extraction means 6 is fed to the verification means 3. This arrangement enables the system statistics used in the verification means to be updated according to variations in the features of the input signals which are to be compared. Furthermore, it enables a correlation to be carried out between the input signals. This enables cross talk between inputs to be calibrated, since cross talk measurements would depend on the degree of correlation existing between input signals.

Figure 7:
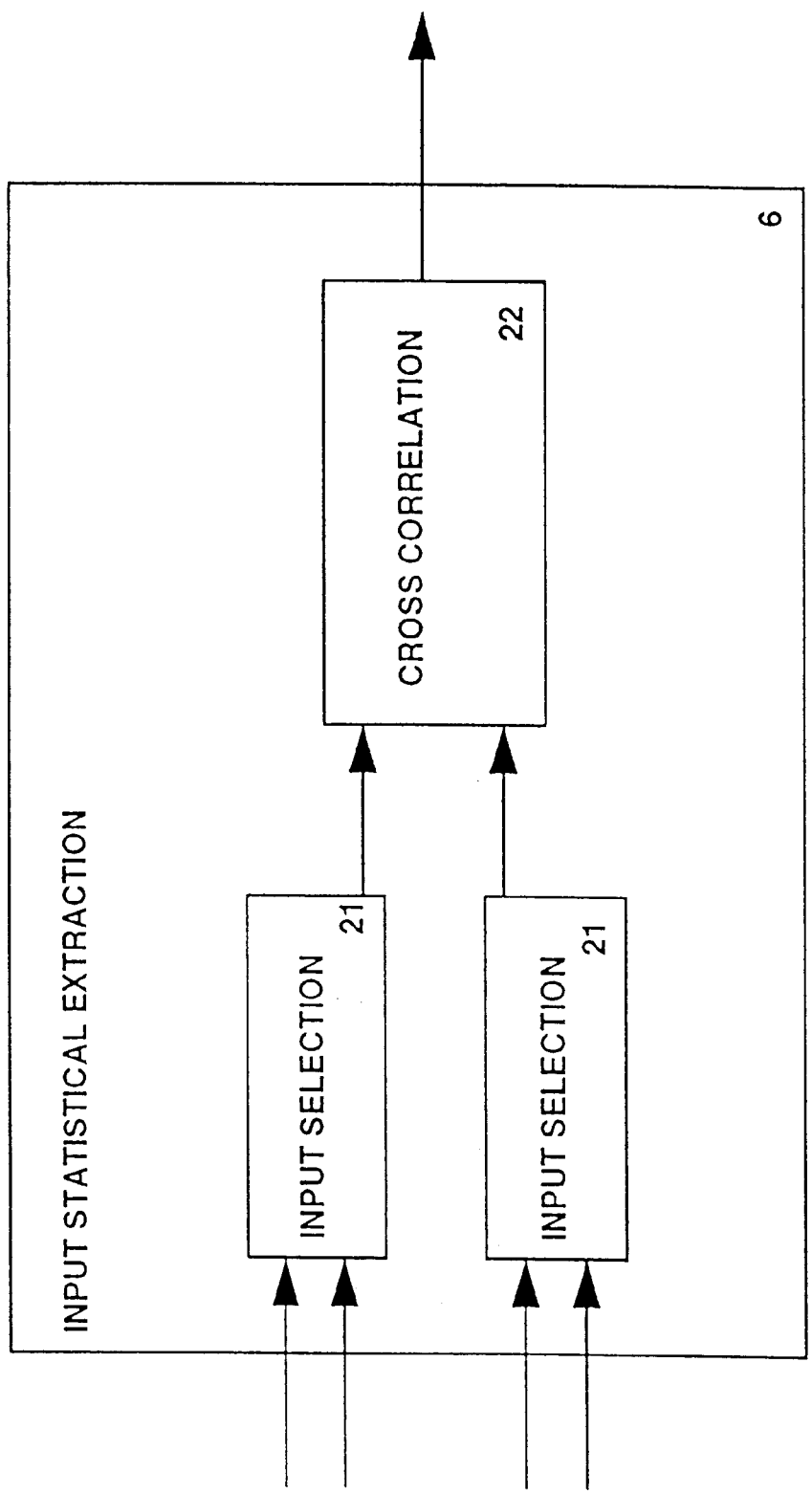
FIG. 7 shows a schematic diagram of an example of the input statistical extraction feature shown in FIG. 6.

FIG. 7 shows the input statistical extraction means 6 in more detail, and shows input selection means 21 for selecting from any number of inputs from the sample extraction means. Any two of the inputs may be fed to a cross correlation means 22.

In practice, although the various calculation elements are shown in functional form, in the figures, they may well in practice all be implemented in one or more digital signal processors. The sampled outputs of the sample extraction means may be relatively low frequency, and therefore could be passed between circuit boards and even passed between racks of equipment to the appropriate comparison means or statistical extraction means, by a local area network. Some form of synchronization would be needed in such a case to ensure there is little uncertainty or error in the time offset between the signals being compared.

Figure 8:
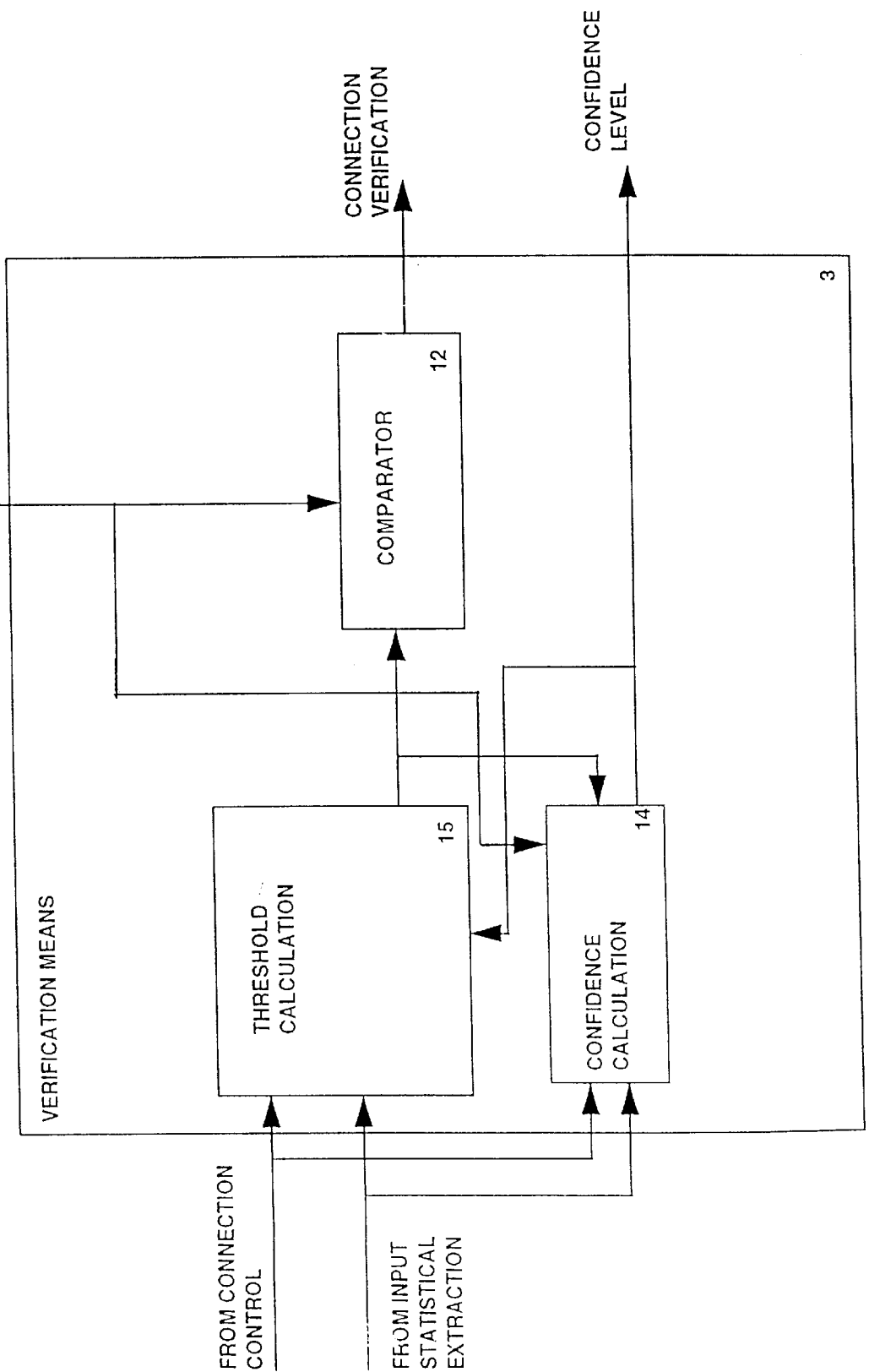
FIG. 8 shows a schematic diagram of a verification means as shown in FIG. 6, including an input from the input statistical extraction feature shown in FIG. 6 and 7.

FIG. 8 shows the verification means 3 for the embodiment in which input statistics are calculated. A threshold calculation means 15 is fed by a signal from the connection controller, to indicate which input is being compared with which output. The threshold calculation means 15 is also fed with the results of the input statistical extraction, and the confidence calculation means 14. The confidence calculation means 14 is fed with the calculated threshold, the outputs from the statistical extraction means, and by an output of the connection control means.

The verification means may be arranged to verify a correct connection on the basis of a threshold determined on the basis of a predetermined cost of false verification, and a predetermined cost of false non-verification. This is a feature of Bayesian extraction techniques.

There are several standard methods of setting a decision threshold depending upon the criteria to be optimized. A minimum probability of error detector minimizes the chance of a mistake of any kind. A Neyman-Pearson detector constrains the probability of a false alarm to a desired value. A Bayesian detector optimizes on the basis of a priori probabilities, and the relative cost of correct and incorrect decisions. Reference is made to Ziemer and Tranter, "Principles of Communications", Houghton Mifflin Company, Boston, 1976. pp 364–375.

Alternatively, the calculation of the threshold can be designed to give the best level of accuracy possible, or can be designed to give a desired confidence in a true result, or a desired confidence in a false result.

The comparison and/or verification means can be located remotely from the transmission system element being verified. Clearly in such a case, it is easier to transmit the output of the sample extraction means to the remote comparison means if the output of the sample extraction means is a relatively low bandwidth signal. Obviously this would require more hardware.

A preferred embodiment of this invention uses the low frequency content of the data streams being transmitted to provide a statistical verification of connectivity. The low frequency (say below 100 kHz) content of high speed (say 10 Gb/s) signals, along with any other low frequency modulations present, are not unique but have features that are substantially independent between signals.

Reliance could be placed on differences in the low frequency content of the data traffic, but for case of correlation, it is preferable to use a low frequency signal which can be consistently and easily identified. For example, the dither signals used for wavelength identification and noise measurement (as shown in U.S. Pat. No. 5513029) may have a period of 1 ms and random phase. The randomness occurs provided that different input signals are sourced from unsynchronized distinct transmitters. With a known transmission delay between the two monitor points and known noise characteristics, phase and amplitude thresholds can be set so that if the peak correlation is within these thresholds then the connection is judged to be correct. If the peak correlation is outside of one of these thresholds then the connection is declared false. The correlation could be carried out in the frequency domain, using fourier transforms, but a time domain correlation is computationally simpler, provided any time delay caused by the signal passing through the switching element is negligible or adequately compensated.

For a single dither signal present and neglecting noise effects, (which may be significant in practice) the confidence in the judgment of a correct connection can be determined by the ratio of the phase resolution detected to the dither period. Given a resolution of, say, less than 1 $\mu$s and a period of 1 ms then 99.9% confidence is obtained in a judgment of "correct" connection. (1-(1 $\mu$s/1ms) ). For multiple independent signals present, as in a wavelength division multiplexed (WDM) system then the probability of falsely judging "correct" is multiplied. For N independent signals the confidence is 1-(1 $\mu$s/1ms)N.

The use of multiple independent sources of low frequency content, such as from multiple dithers or from the low frequency content of the data, can increase the confidence in this verification of connectivity. The confidence in a declaration of a "false" connection is a function of the noise present, the number of samples used, and the thresholds set. These parameters can be chose to obtain any desired level of confidence in a "false" declaration.

This method can also be used with bidirectional optical transmission by also monitoring the signals in the other direction.

Accurate relative time references at the input and output sampling help to improve the phase resolution. Digital interpolation techniques can be used to also improve the phase resolution to better than the time between digital samples.

The "optical network" considered may consist of all or part of one device such as an integrated optical switch, or one card, or one shelf, or one cross-connect, or one building, or be geographically dispersed. The method can be repeated, for multiple stages in series, nested, or concatenated to generate more information on the location of false connections.

Also, the system may be used to detect corruptions other than a complete misconnection, such as combining two separate sets of signals, cross-talk and optical noise. The verification means may be replaced with appropriate means for processing the result of the comparison, according to the type of the corruption being analyzed. Other features of the embodiments described above are equally applicable to this embodiment.

Unique signal identifiers could be incorporated into the digital data signals, for example into overhead portions. Alternatively, they could be incorporated at the analogue optical level, either globally or upon command from an auditing function. This may increase the confidence in the judgment of a correct connection at the cost of increased complexity. These may be added to or modulated onto the signal at the transmitter, or optical amplifier, or at other points along the optical transmission path. These could have unique frequency content and/or unique optical characteristics such as wavelength, phase, coherence, chirp, direction, or polarization. Unique optical characteristics may require specific optical equipment, such as an optical filter, to assist in the detection of that identifier.

The tapped optical signal could be "looped back" so that the two measurements are taken at the same location. This would ease the synchronization implementation or allow optical comparisons such as optical correlation. A portion of the optical signals could be switched to a set central monitoring point. Problems with loop-backs and central monitoring include additional complexity and reduced confidence in fault coverage.

The invention can provide an inexpensive addition to an optical switching unit to provide local verification of connections. Most of the components may already be present for monitoring optical power.

It is not necessary to disturb the traffic on the transmission system and parameters can be continuously or remotely monitored. Local verification allows much simpler fault isolation methods to be used. Faults can be isolated to varying degrees such as to a unit level, rack level or field replaceable unit level, according to the location and spacing of verification systems.

A transmission system may comprise many switching elements, and fault isolation can be improved if the output of each is verified. This can be done either by comparing the output of a particular element with a corresponding input to that element, or with a corresponding input to a preceding element.

In place of or as well as verification means, the result of the comparison or the output of the verification could in principle be used to control a parameter of the element, to improve its output, or fed back to proceeding elements to alter the routing of the signal. For example, fault detection could trigger rerouting of the signal via other elements, to avoid the faulty element.

I claim:

1. A verification system for a switching element in an optical network comprising means for comparing an optical signal before it is input to the switching element, with an optical signal after being output from the switching element, and means for verifying from the comparison whether the switching element has switched the input signal correctly.

2. The system of claim 1 wherein the comparison means is arranged to extract and compare a portion of the frequency spectrum of the input and of the output signals, the bandwidth of the portion being substantially less than the bandwidth of the data.

3. The system of claim 1 wherein the comparison means is arranged to extract and compare features of the input signal which are unique amongst the input signals to the switching element.

4. The system of claim 1 wherein the comparison means is arranged to extract and compare features of the input signal which are not unique amongst input signals to the switching element, but are at least partially independent.

5. The system of claim 1 wherein the comparison means comprises means for comparing the input and output signals by pattern matching.

6. The system of claim 1 wherein the verification means is arranged to verify a correct connection on the basis of a threshold determined on the basis of a predetermined cost of false verification, and a predetermined cost of false non verification.

7. The verification system of claim 1 wherein the switching element comprises a plurality of input paths, and the verification system comprises means for determining which input path is desired, and means for selecting the corresponding input signal for comparison with the output signal.

8. The verification system of claim 1 wherein the system comprises means for comparing a plurality of different inputs to the switching element, and determining a degree of cross-talk between said paths.

9. The verification system of claim 1 wherein the switching element has a plurality of input signals, and the system comprises means for comparing a pair of said plurality of input signals and determining a degree of matching between patterns in them.

10. The verification system of claim 9 wherein the verifying means comprises means for determining a confidence level in the verification result on the basis of the determined degree of matching.

11. The verification system of claim 9 wherein the verifying means comprises means for determining a threshold based a desired confidence level.

12. An optical transmission system comprising a plurality of switching elements which comprise the verification system of claim 1.

13. A method of verifying the operation of a switching element in an optical transmission system, the method comprising the steps of:

comparing an optical signal before it is input to the switching element, with an optical signal after being output from the switching element: and verifying from the comparison whether the switching element has switched the input signal correctly.

14. An optical switching element comprising:

one or more optical input paths;

one or more optical output paths;

an optical interconnect for selectively interconnecting the one or more optical output paths to one of the one or more optical input paths;

a comparator for comparing an input optical signal on one of the optical input paths with an output optical signal on the one or more optical output paths;

and a processor for determining if the input optical signal has been connected to the correct output path on the basis of the comparison by the comparator.

15. The switching element of claim 14, the comparator being operable by pattern matching.

16. The switching element of claim 14, having a plurality of input optical paths, the comparator being arranged to compare a plurality of the input optical signals with one of the output optical signals, and the processor being arranged for determining the cross-talk between one of the input optical signals which is not switched to the output, and the output optical signal.

17. The switching element of claim 14, the comparator being arranged to compare the phase of a low frequency dither impressed on the input optical signal at a random phase, with a corresponding dither on the output optical signal.

18. An optical transmission system comprising at least one of the switching elements of claim 14.

* * * * *